J. J. BERRES.
STONE GATHERER.
APPLICATION FILED AUG. 27, 1915.
1,191,554.
Patented July 18, 1916.
2 SHEETS—SHEET 2.
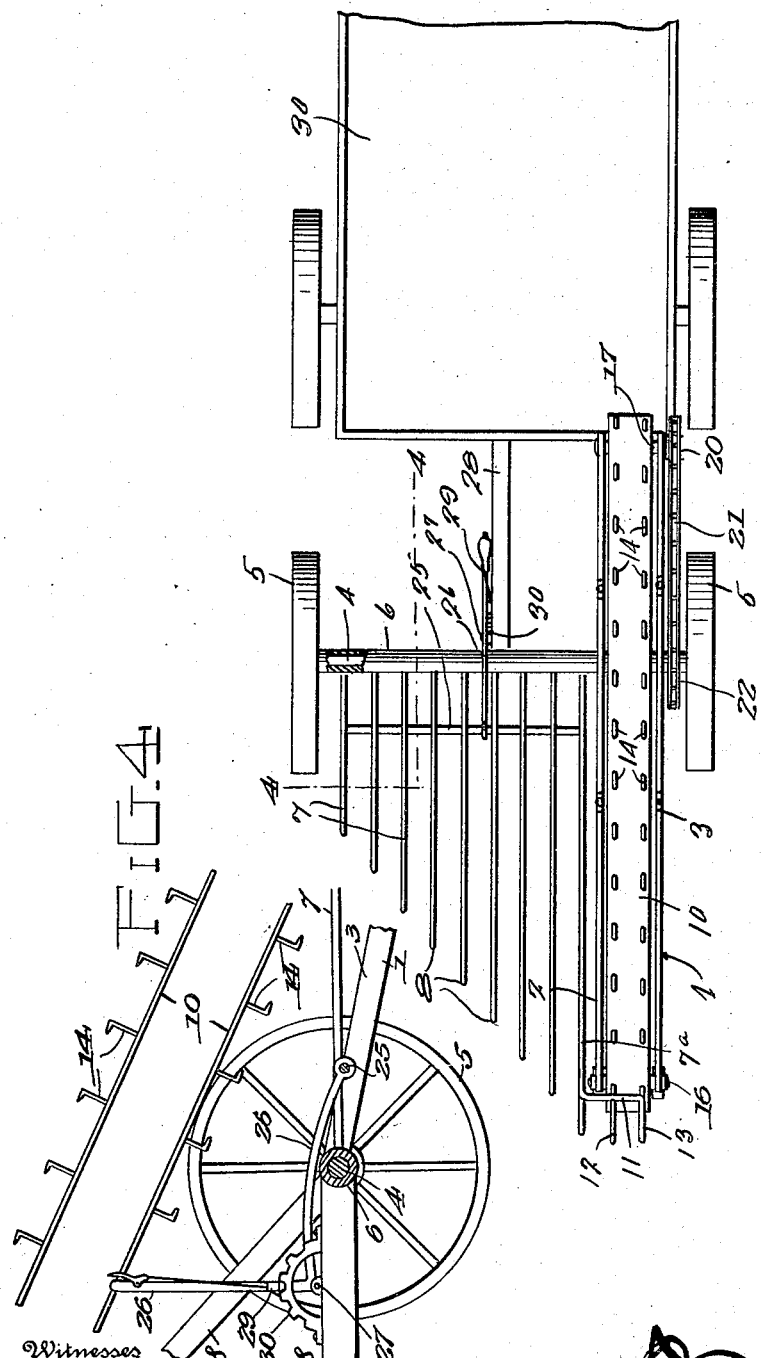
Inventor
J.J.Berres

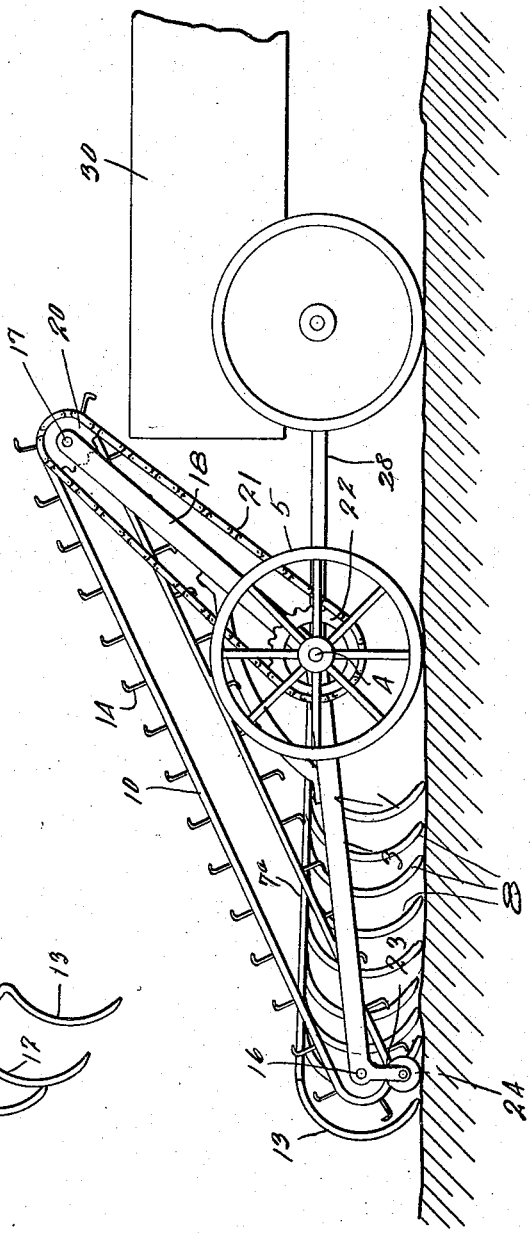

UNITED STATES PATENT OFFICE.

JOHN J. BERRES, OF BOYD, WISCONSIN.

STONE-GATHERER.

1,191,554. Specification of Letters Patent. Patented July 18, 1916.

Application filed August 27, 1915. Serial No. 47,661.

*To all whom it may concern:*

Be it known that I, JOHN J. BERRES, a citizen of the United States, residing at Boyd, in the county of Chippewa and State of Wisconsin, have invented certain new and useful Improvements in Stone-Gatherers; and I do hereby declare the following to be a full, clear, and exact description of the invention, such as will enable others skilled in the art to which it appertains to make and use the same.

This invention relates to a device for gathering or picking up stones from the surface of a field, and depositing them in a wagon, whereby they may be transported from the field.

The primary object of this invention is to provide a stone gatherer as specified, which is comparatively simple in construction, embodying a plurality of pivotally supported tines, which are provided for engaging the stones, and rolling them laterally, to a position where they are picked up by a conveyer, which elevates them and deposits them in a wagon bed.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a side elevation of the improved stone gatherer, Fig. 2 is a top plan view of the gatherer, and Fig. 3 is a perspective view of one of the gathering tines. Fig. 4 is a sectional view on the line 4—4 of Fig. 2.

Referring more particularly to the drawings, 1 designates the supporting structure of the stone gatherer as an entirety, which includes a pair of parallel side bars 2 and 3, which have an axle 4 rotatably supported by their forward ends, and projecting transversely therefrom, for a relatively long distance upon one side of the bar 2. The axle 4 has supporting wheels 5 mounted upon its spindle ends, and a sleeve 6 encompassing the section of the axle which is positioned outwardly from the side board or bar 2. The sleeve 6 has a plurality of rearwardly extending tines 7, secured thereto, which tines are of different lengths, the outermost tines being shorter than the one next thereto, and each tine increasing a corresponding distance in length, therefrom, as is clearly shown in Fig. 2 of the drawings. The tines 7 have their rear ends curved, as is shown at 8 in Fig. 1 of the drawings, for engaging the surface of the ground over which they travel, and they are spaced from each other, so as to prevent the rocks from passing therebetween. By gradually increasing the length of the tines, the rocks engaged thereby will be caused to travel laterally, when they engage the curved ends of the tines, to a position rearwardly of the conveyer structure 10.

The tine 7ª, which is next to the side bars 2, has a transversely extending projection 11 formed thereon, which extends across the rear lower end of the conveyer 10, and has a pair of spaced rearwardly extending tines 12 and 13 formed thereon, which are in alinement with the conveyer, and are provided for receiving the stones or rocks from the tine 7ª, and holding them in position for being picked up by the teeth 14, which are secured to the flights of the conveyer 10 at longitudinal and transversely spaced intervals, about the surface of the same.

The conveyer 10 travels about rollers which are carried by shafts 16 and 17. The shaft 16 is carried by the rear ends of the side bars 2 and 3, and the shaft 17 is carried by the upper end of upwardly extending projections or extensions 18 which are formed on the bars 2 and 3, and extend upwardly and forwardly from their forward ends and the axle 4. The shaft 17 has a sprocket 20 mounted thereon, about which the sprocket chain 21 travels. The sprocket chain 21 also travels about the sprocket 22, which is carried by the axle 4, for rotation therewith, whereby the conveyer is operated by the rotation of the axle, and the traction of the stone gatherer. The rear ends of the bars 2 and 3, extend downwardly, forming depending projections 23, which rotatably support relatively small supporting wheels 24, for holding the rear end of the conveyer the proper distance above the ground. The tines 7 rest upon a bar 25, which is connected to a lever 26. The lever 26 is pivotally connected at 27, to the coupling pole 28 of the harvester, and it has a dog mechanism 29 carried thereby, which co-acts with a quadrant 30 for holding the lever in various adjusted pivotal position. By moving the lever 26, upon its pivotal connection, the bar 25 will be raised or lowered, for raising or lowering the curved ends of the tines 7, into or out of a position for engagement with the surface of the ground, for engaging rocks which might be carried thereby. The coupling pole 28 is provided for connecting the rock picker or gatherer rearwardly of a wagon, or similar device, indicated at 30, so that the rocks, which are gathered by the device, may be deposited from the upper end of the conveyer 10, into the bed of the device 30.

In the operation of the improved rock gatherer; the lever 26 is operated, for lowering the tines 7, so as to permit their curved ends to engage the surface of the ground, over which the harvester is traveling. The rocks engaged by the curved ends of the tines will be passed from one tine to another, owing to the gradual increasing of the length of the tines, until they reach the relatively short tines 12 and 13, where they will be engaged by the fingers 14 carried by the conveyer 10. The fingers 14 will engage the rocks, and hold them while they are elevated, by the travel of the conveyer 10, and deposited into the wagon or suitable receptacle 30. The pivotal movement of the tines 7 is permitted, owing to the fact that the sleeve is rotatably mounted upon the axle 4.

In reducing the invention to practice, certain minor features of construction, combination and arrangement of parts may necessitate alteration, to which the patentee is entitled, provided such alterations are comprehended within the scope of what is claimed.

What is claimed is:—

1. In a rock gatherer, a supporting structure, an axle carried by said supporting structure and extending transversely from one side thereof, supporting wheels mounted upon said axle, a sleeve rotatably mounted upon the transversely extending section of said axle, and a plurality of tines secured to and extending rearwardly from said sleeve, said tines gradually increasing in length from the outermost tine to the innermost tine which is positioned next to said supporting structure.

2. In a stone gatherer, a supporting structure, an axle carried by said supporting structure and extending transversely from one side of the structure, supporting wheels mounted upon said axle, a sleeve rotatably mounted upon the outwardly extending portion of said axle, a plurality of tines connected to said sleeve and extending rearwardly therefrom, said tines having their rear ends curved, each of said tines being slightly longer than the outer tine next thereto, and a conveyer carried by said supporting structure for receiving the rocks from said tines.

3. In a rock gatherer, a supporting structure, an axle carried by said supporting structure and extending transversely from one side thereof, supporting wheels mounted upon said axle, a sleeve rotatably mounted upon the transversely extending section of said axle, a plurality of tines secured to and extending rearwardly from said sleeve, said tines gradually increasing in length from the outermost tine to the innermost tine which is positioned next to said supporting structure, a bar engaging the under surface of said tines, a pivotally supported lever connected to said bar for moving said tines into or out of a rock engaging position.

4. In a rock gatherer, a supporting structure, an axle carried by said supporting structure and extending transversely from one side thereof, supporting wheels mounted upon said axle, a sleeve rotatably mounted upon the transversely extending section of said axle, a plurality of tines secured to and extending rearwardly from said sleeve, said tines gradually increasing in length from the outermost tine to the innermost tine which is positioned next to the said supporting structure, a bar engaging the under surface of said tines, a pivotally supported lever connected to said bar for moving said tines into or out of a rock engaging position, a conveyer carried by said supporting structure and having a plurality of fingers carried thereby for receiving the rocks from said tines and elevating them for deposit into a wagon, and means for operating said conveyer by the rotation of said axle.

5. In a rock gatherer, a supporting structure, an axle carried by said supporting structure and extending transversely from one side thereof, supporting wheels mounted upon said axle, a sleeve rotatably mounted upon the transversely extending section of said axle, a plurality of tines secured to and extending rearwardly from said sleeve, said tines gradually increasing in length from the outermost tine to the innermost tine which is positioned next to the said supporting structure, a bar engaging the under surface of said tines, a pivotally supported lever connected to said bar for moving said tines into or out of a rock engaging position, a conveyer carried by said supporting structure and having a plurality of fingers carried thereby for receiving the rocks from said tines and elevating them for deposit into a wagon, means for operating said conveyer by the rotation of said axle, the tines next to said supporting structure having a transversely extending projection formed thereupon adjacent its rear end, and a pair of rearwardly extending relatively short tines formed upon said transversely extending projection, for engaging the rocks for positioning them for engagement by said conveyer-carried fingers.

In testimony whereof I affix my signature in presence of two witnesses.

JOHN J. BERRES.

Witnesses:
F. J. LAVELLE,
R. J. SCHATZ.

Copies of this patent may be obtained for five cents each, by addressing the "Commissioner of Patents, Washington, D. C."